United States Patent [19]
Wingerd

[11] 3,797,134
[45] Mar. 19, 1974

[54] ARITHMETIC CONCEPTS DISPLAY BOARD

[76] Inventor: Eldon S. Wingerd, 12108 Deerwood Ln., Sunnymead, Calif. 92388

[22] Filed: May 15, 1972

[21] Appl. No.: 253,337

Related U.S. Application Data

[63] Continuation-in-part of Ser. No. 58,217, July 27, 1970, abandoned.

[52] U.S. Cl. .................................................. 35/34
[51] Int. Cl. ............................................. G09b 23/04
[58] Field of Search .............. 35/34, 30, 31 R, 31 E, 35/31 G, 70, 72

[56] References Cited
UNITED STATES PATENTS

| | | | |
|---|---|---|---|
| 3,083,475 | 4/1963 | LePoudre | 35/34 X |
| 3,191,318 | 6/1965 | Hoffmann | 35/34 |
| 3,235,975 | 2/1966 | Pierson | 35/30 |
| 2,611,193 | 9/1952 | Davis | 35/31 R |
| 1,594,376 | 8/1926 | Passmore | 35/31 F |
| 3,314,168 | 4/1967 | Heckman | 35/31 G |
| 3,461,573 | 8/1969 | Stibal | 35/34 |
| 1,310,997 | 7/1919 | Linay | 35/70 |

*Primary Examiner*—Wm. H. Grieb
*Attorney, Agent, or Firm*—Wm. Jacquet Gribble

[57] ABSTRACT

A display board has a grid portion of equal squares, with pegs rising from every other gridline intersection on every other grid line. The grids are defined by ridges or grooves. Adjacent borders of the board bear a number for each row of squares, advancing serially from the common corner square. Bands or plates define circle segments of various proportions within a circle defined by lines or pegs about the intersection of numbered X and Y axes. Elastic bands adapted to fit about two or more pegs show varied geometric shapes, and rods equal to a multiple of the circle radius may move on the board, as may cubes the size of a grid square, the cube faces having arithmetic symbols to indicate problems to be solved in accordance with the cube placement on the board grid with respect to the marginal numbers.

2 Claims, 16 Drawing Figures

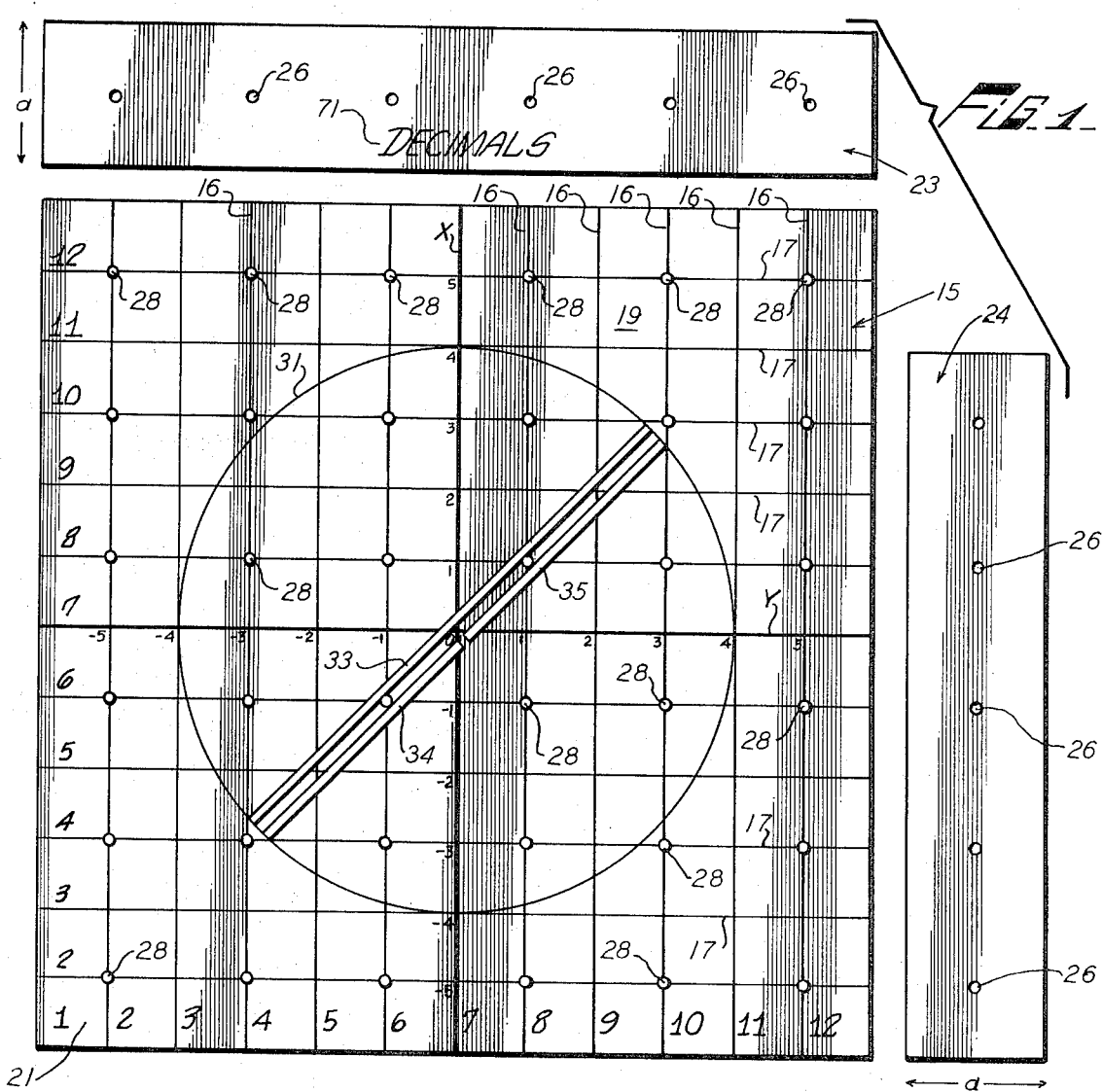

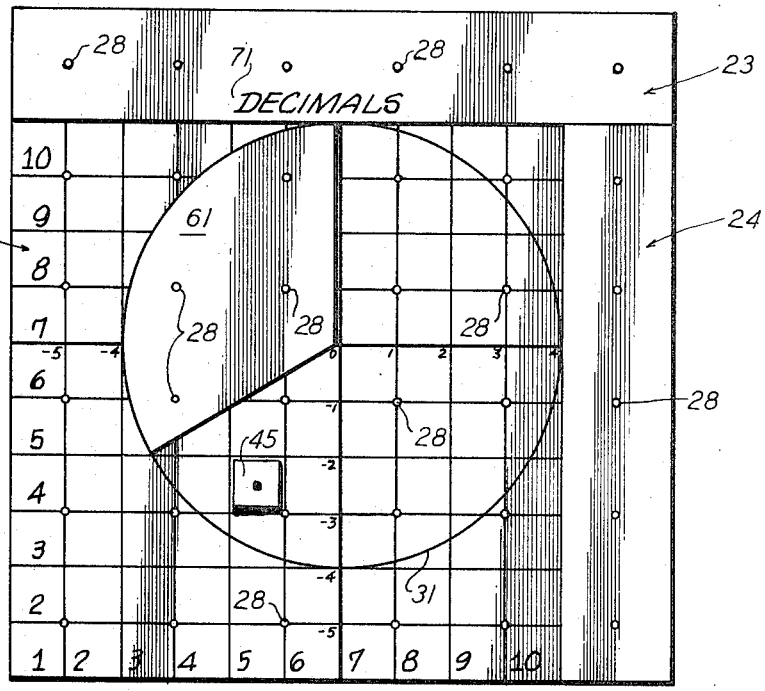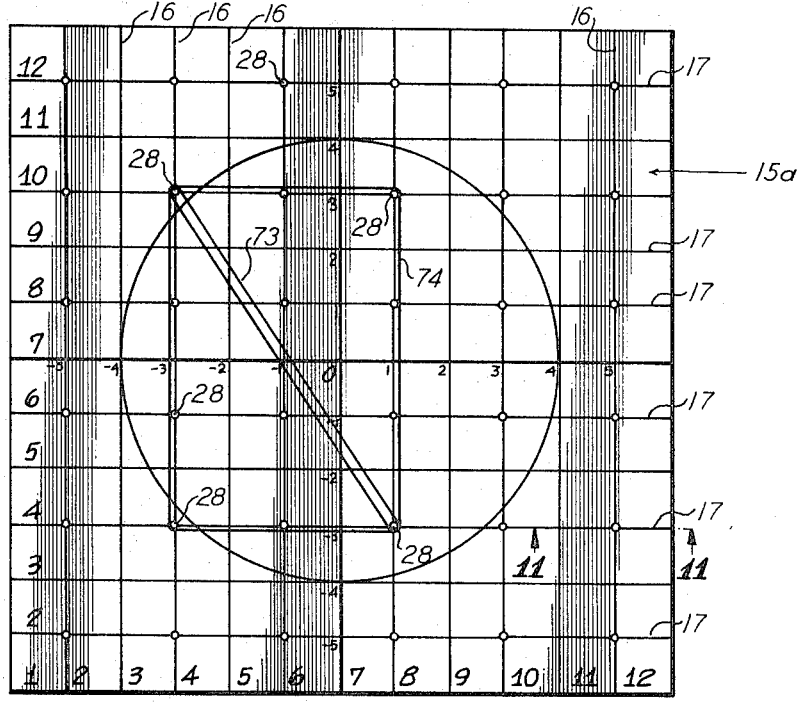

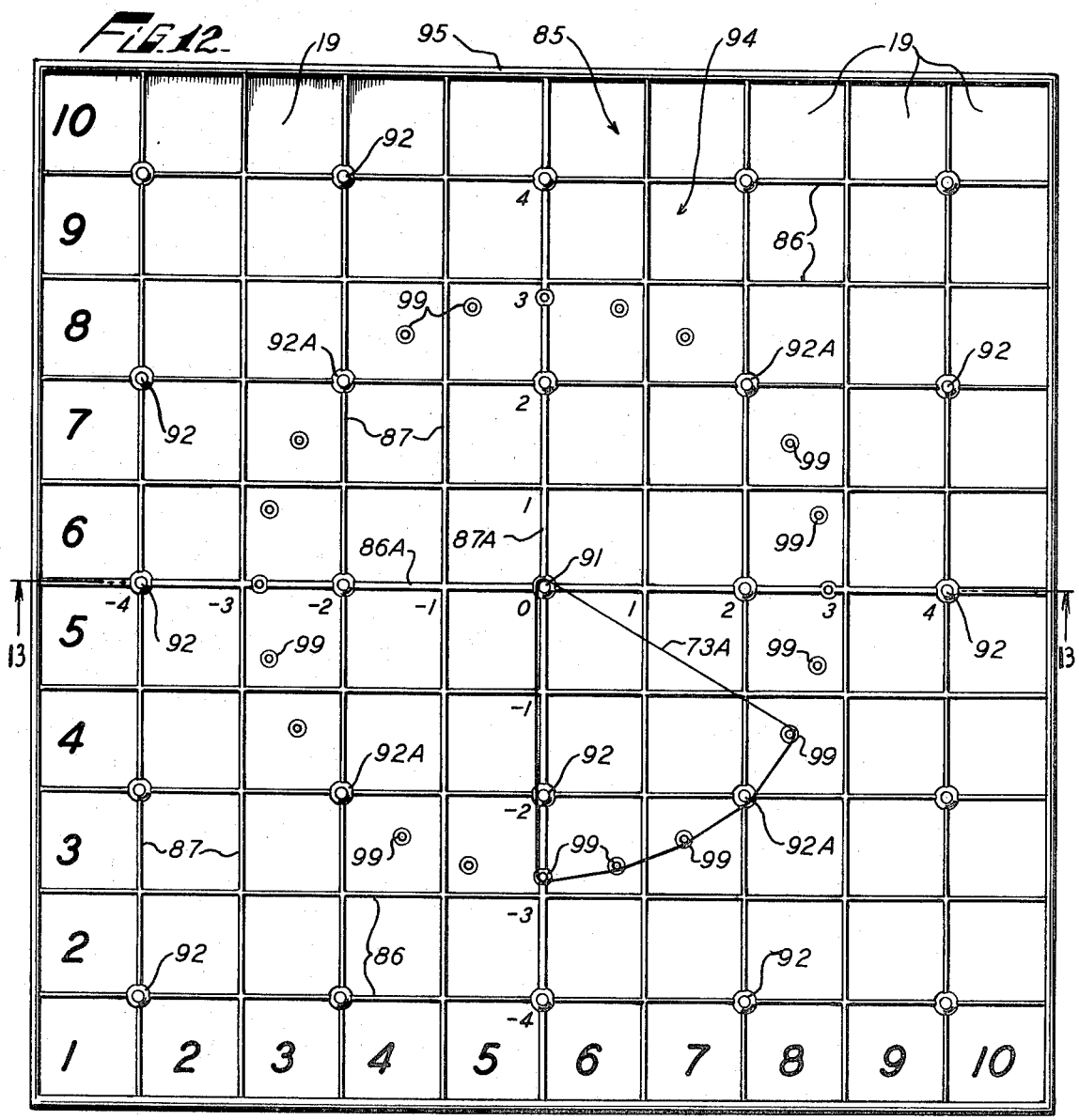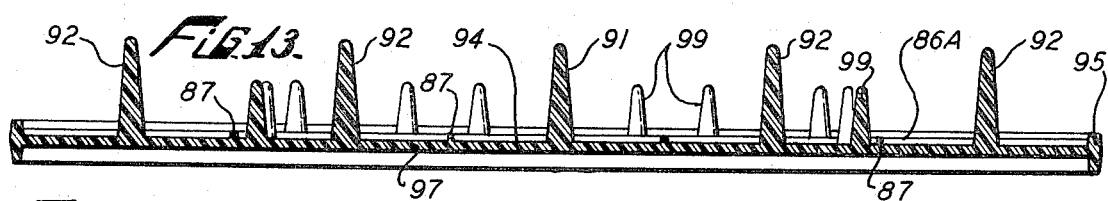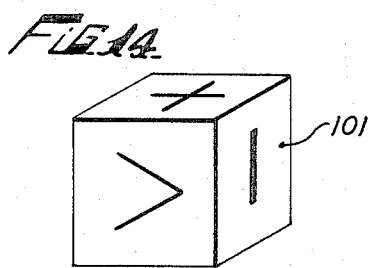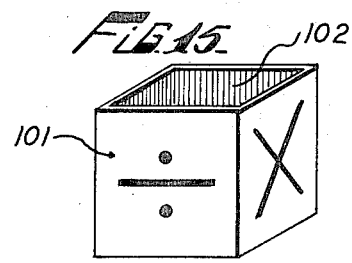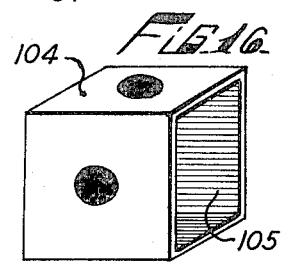

ARITHMETIC CONCEPTS DISPLAY BOARD

RELATED APPLICATIONS

This application is a continuation-in-part of my presently pending application of the same title filed July 27, 1970, Ser. No. 58,217, now abandoned, the subject matter of which was recorded under the Document Disclosure program on May 14, 1970.

BACKGROUND OF THE INVENTION

The invention relates to arithmetic instruction devices and more particularly to such devices embodied in display boards with a pattern against which movable components may be placed to aid in conveying mathematical concepts and arithmetic drill. Such devices are exemplified by U.S. Pat. No. 3,191,318 issued June 29, 1965 to R. G. Hoffman and U.S. Pat. No. 3,461,573 issued Aug. 19, 1969 to W. O. Stibal.

A continuing concern in mathematical education is the need to convey clearly and precisely the arithmetic and mathematical concepts necessary to real understanding of the rote methods involved in much of the problem-solving arithmetic techniques. Ideally all senses of a learner should be used to convey the concepts. In a classroom with several or many students only two or three senses can normally be impinged, namely, sight, hearing and touch. Such concepts as the relationship between length and area, area and quantity, shape terminology, shape patterns, etc. can be seen, can be explained and can be experienced through touch.

In a classroom sight and sound are more generally used than touch when a teacher demonstrates, yet touch can be a very important perceptive medium to some individuals deficient in sight and hearing or withdrawn in those areas. Demonstration devices which are usable to reach all three senses are most desirable.

In arithmetic drill, or number relationship exercise, such as sums, products, differences and quotients, it is better if the demonstration device can be seen simultaneously by all the class and yet be usable by that single child needing special work and opportunity to comprehend clearly numbers in terms of area, size, order or length, in tactile as well as eye encounter.

The present invention provides a display board which accomplishes the desired flexibility while being easy for the teacher to use, simple to make and efficient in conveying many types of information from beginning numbers to intermediate mathematical relationships.

SUMMARY OF THE INVENTION

The invention contemplates a mathematical concepts display device which comprises a display board having a grid pattern of equal squares, pegs rising from the intersections of certain of the grid lines, and a circle described on the board centrally thereof, preferably by lesser pegs. A plurality of flexible bands, such as conventional rubber bands or garden ties, are adapted to fit about the pegs to define various geometric shapes. A plurality of indicators, such as cubes or rods, are movable on the board. Preferably the cubes bear mathematical indicia on each face. The rods are preferably equal to, or a multiple of, the circle radius.

In an alternate embodiment a pair of margin plates, each having holes coordinating with peg spacing, are adapted to fit along adjacent margins of the board to restrict the visible grid pattern to a certain number of squares, such as a pattern of one hundred. Each row of squares in both directions is numbered by consecutive numerals starting from the corner square common to both horizontal and vertical rows.

In a preferred form of the invention an X axis and a Y axis intersect at the center of the board and defined circle. The extent of each axis is numbered positively and negatively from the point of intersection in conventional ordinate fashion.

The display board of the invention accomplishes the objectives of providing, in an inexpensive apparatus, means for teaching and demonstrating arithmetic drill from simple addition and subtraction through multiplication and division, and teaching the concepts of shapes and size, the basic idea of decimals and provides means for conveying the geometric concepts of relationships of shapes and sizes to area and the formulas for achieving area when given the perimeter. In addition, ordered pairs may be plotted on the display device and the concepts of positive and negative numbers portrayed.

These and other advantages of the invention are apparent from the following detailed description and drawing.

BRIEF DESCRIPTION OF THE DRAWING

FIG. 1 is a plan view of an embodiment of the invention including various pieces which can be applied to the board;

FIGS. 2 and 3 illustrate in perspective a symbol piece movable upon the display board;

FIG. 4 is a perspective view of a second symbol piece;

FIGS. 5, 6 and 7 each show a set of circle segments;

FIG. 8 illustrates a plurality of flexible bands;

FIG. 9 illustrates the display device of FIG. 1 with the marginal plates in place on the board;

FIG. 10 illustrates in plan view an alternate embodiment of the invention;

FIG. 11 is an elevational section taken along line 11—11 of FIG. 10;

FIG. 12 is a plan view of an alternate embodiment of the invention having a molded board;

FIG. 13 is a sectional elevation taken along line 13—13 of FIG. 12;

FIGS. 14 and 15 are perspective views of a hollow functions cube; and

FIG. 16 is a perspective view of a decimal cube.

DESCRIPTION OF THE EMBODIMENTS

In FIG. 1 a planar display board 15 has a plurality of parallel, equally spaced vertical grid lines 16 and a like number of parallel, equally spaced horizontal grid lines 17 which define a plurality of equal squares such as the square 19. A central vertical grid line X, shown as a heavier line, defines a central ordinate or X-axis. A horizontal grid line Y central of the board, shown as a heavier line, defines an intersection intersecting ordinate or Y-axis. The intersection of the axes is marked as O and each grid line intersecting each axis is numbered away from the O point in either positive or negative numbers as is conventional in a coordinate grid.

The left vertical row of squares as seen in FIG. 1 is marked with consecutive numbers in each square starting with number 1 in corner square 21. The bottom horizontal row is similarly marked with consecutive numbers starting with 1 in the corner square.

A pair of margin plates 23, 24 extend along the edges of the display board. Each margin plate has a plurality of central holes 26 spaced to match the spacing of a plurality of pegs 28 which rise from the display board at certain intersections of the grid lines. The pegs may extend about an inch above the surface of the board and the grid is preferably predicated upon one-inch spacing, although other spacings are not precluded.

In the embodiment of FIG. 1 each margin plate 23, 24 has a width $a$ equal to the span between two grid lines.

A circle 31 is inscribed on a board about a center coinciding with the intersection of the X and Y axes. The diameter of the circle should be great enough that the circle is plainly visible from the farthest seat of the classroom.

A plurality of symbolic rods lies across the circle in FIG. 1. The longest rod is a diametral rod 33. The two short rods 34, 35 are half the length of the rod 33 and each represents the circle radius. The rods are movable with respect to the board and may be placed at any angle across the circle.

FIGS. 2 and 3 illustrate a function indicator cube 37, movable on the board. The mathematical symbols for addition, equality and "more than" or "less than" (depending upon direction) are inscribed on cube faces 38, 39, 40, respectively, as shown in FIG. 2. In FIG. 3 the arithmetic signs for multiplication, subtraction and division are shown on faces 41, 42, 43, respectively, of cube 37. The indicator cube of FIG. 2 and of FIG. 3 is used to convey various arithmetic concepts and in arithmetic drills, such as multiplication and addition, in a manner to be explained later.

In FIG. 4 an indicator cube 45 has a central dot 46 on each cube face. The dot represents the decimal point.

FIGS. 5 through 7 show circle segment sets drawn to a lesser scale than the scale of FIG. 1. The sets preferably have the same diameter as the inscribed circle 31 of the display boards, and equal to the length of rod 33.

The set of FIG. 5 comprises two half circles 51, 52 which are lined to indicate the colors yellow and violet, respectively. Each circle half has a plurality of holes 54 patterned in accordance with the distribution of pegs 38 within the circle 31 such that the circle halves may be attached to the board by means of the pegs such that the segments lie within circle 31. The circle set of FIG. 6 comprises three equal segments 61, 62, 63 which may be colored white, green and red as indicated by the shade lines. Each of the three segments of the set of FIG. 6 has a plurality of holes 54 which again are spaced in accordance with the pattern of pegs within circle 31 such that the segments 61-63 may be attached to the board within circle 31.

In FIG. 7 a circle segment set has four elements 65, 66, 67, 68. The segments are shaded, respectively, to show the colors blue, orange, gray and brown. Each of the segments has a plurality of holes 54 adapted to attach the segments to pegs within circle 31 of the display board.

While the segments of FIGS. 5–7 have been shown as varying in color within a set, uniform color may be utilized, depending upon the concept desired to be taught. The color patterns shown in the illustrative embodiment are chosen such that the separate segments may be distinguished at a distance from the display board. In other instances it may be desirable to show the unity of the assembly of the segments, in which case the segments of each set can be uniform in color.

In FIG. 9 display board 15 has applied to it marginal plates 23, 24. As can be seen by comparing FIG. 9 with FIG. 1, those horizontal square rows marked 11 and 12 are covered by plate 23 while the vertical rows marked 11 and 12 are covered with marginal plate 24. The remaining display board site is thus reduced to a perimeter of 10 squares in each direction, which affords a field or grid of 100 equal squares which, as indicated by the legend 71 on plate 23, is useful in teaching decimal concepts. The indicator cube 45 may be placed on the restricted grid of FIG. 9 in any orientation such that its central spot 46 indicates the decimal character of the problem being discussed or drilled. For instance, the cube indicator placed at the intersections of horizontal row 4 and vertical row 5 indicates that the product of the two numbers is 0.20, and not 20, and that the squares encompassed in the involved rows equal 20/100 of the total area exposed. Other decimal concepts are similarly displayed and illustrated through use of the elements of the inventive apparatus.

FIG. 9 also illustrates the circle 31 occupied by a one-third segment 61 of a given circle set. A general indication of the value of one-third of a circle can be gained by a comparison of the squares covered and the squares uncovered when the segment is in place. One concept of fractions can also be introduced by proper utilization of the circle segment sets as they illustrate that each segment is less than the whole area of the circle. The concept of angles can also be discussed as the segments visually indicate the relationship between the included angle of the apex of each segment and the circumference of the circle with which the segment coincides. Rods 34, 35 can demonstrate that each segment side is a radius.

In FIG. 8 a plurality of rubber bands 73, 74, 75 of equal length are shown. Two of such bands, 73, 74, are shown in FIG. 10 stretched about a plurality of pegs 38 on display board 15 to illustrate geometric shape. Band 74 defines the perimeter of a rectangle which is three squares horizontally and six squares vertically. The rule for areas of rectangles can thus be illustrated since the pupils can observe and count the number of squares within the rectangle and realize that the number of included squares is the product of the number of squares on two sides of the perimeter.

Band 73 is stretched diagonally about opposite corner pegs of the rectangle defined by band 74. Band 73 thereby separates the rectangle defined by band 74 into two equal right triangles. This configuration may be used to demonstrate the formula for the area of a triangle in which its area is equal to one-half the base times the altitude and the specific terms for triangle sides can be taught at the same time and related to the rectangle sides.

It is obvious that the space arrangement of pegs can be varied in other display devices in accordance with the invention. The presently preferred spacing is a peg rising from every other intersection along every other horizontal and vertical grid line. The areas definable by bands around the pegs thus are restricted mainly to figures whose sides are multiples of two, making the results of area problems in most instances representable by whole numbers. However, pegs rising from each intersection are not precluded from the concept of the invention.

At this juncture it might be pointed out that the embodiments of FIG. 1 and 10 both have twelve rows of squares in each direction. Therefore, to achieve a remaining grid of 100 squares, marginal plates 23 and 24 have a width equal to two squares. Should a board with more than twelve rows in each direction be desired, the width of the marginal plates 23, 24 would be adjusted to cover those squares along the margins in excess of ten.

For many pupils the tactile sense is most important. The sense of touch conveys information which the other sense organs do not effectively convey for those physically or psychically handicapped. Such concepts as area and number order and length can be comprehended by touch if the grid lines are distinguishable by touch from the surface of the board. Therefore, the described embodiment of the invention combines with the other elements a display board in which the grid lines are defined by shallow grooves. FIGS. 10 and 11 illustrate a board 15A having a plurality of vertical grooves such as the groove 81 and a plurality of horizontal grooves such as the groove 82. A peg 28a is fixed in the board at the intersection of groove 82 with a vertical groove 81 (not shown).

The tactile sense may be utilized by boards in which the grid squares are defined by ridges, rather than grooves. In the preferred embodiment of the invention shown in FIGS. 12 through 16 a board 85 has a plurality of squares 19 defined by ridges 86, 87. A plurality of ridges 86 extend horizontally in FIG. 12 and a plurality of ridges 87 extend vertically in that FIG. at equal intervals in each direction to define equal rows of squares 19.

As in the previously described embodiment, the outer rows of squares are numbered from the bottom left square in sequence from 1 to 10, making 100 squares. A central peg 91 is at the intersection of the central ridges 86A, 87A. The ridges 86A, 87A are the axes of the board. The central peg and a plurality of further pegs 92 are integrally molded with the board surface 94, as is a marginal rim 95. The rim extends both upwardly and downwardly from web 97 which defines the surface 94.

A plurality of lesser pegs 99 extend from the surface at equal increments circumferentially at equal distances from central peg 91 to define a circle about the intersection of the axes. The pegs 99 are distinguishable from the pegs 92 because of their lesser diameter and extension from the surface 94. Preferably the lesser pegs are the same distance radially with respect to central peg 91 as are pegs 92A of horizontal rows 3 and 7 such that the taller pegs 92A are reference pegs indicating 45° of arc from either axis, while the lesser pegs are set at 15° intervals of arc around the circle.

The lesser pegs may also be molded with the board and rim so that an integral structure results having gridded surface, pegs and defined circle and axes, with the grid squares outlined by means susceptible to touch comprehension. The rim and ridges strengthen the board so that the web thickness may be minimal, lowering material costs. The board of FIG. 12 may perform the functions of the board of FIGS. 1 and 9 without the need of circle segments and rods because of the central peg and the circle of lesser pegs. Only bands 73 and function cubes are needed, as indicated in FIG. 12 by the segment of a circle defined by a band 73A circumscribing the peg 91 and pegs 92A and 99.

A function indicator cube 101 of FIGS. 14 and 15 contains function symbols on each of its faces, as does the previously described function cube 37. However, in order to adapt to positioning in those grid squares from which pegs 99 rise, one face 102 is left open on the cube, which is hollow. Preferably the sign "=" is omitted and the cube is open opposite the sign "+," although cubes differently arranged are within the contemplation of the invention such as cubes having one hollow side or face and a single symbol on the face opposite the hollow side. A decimal cube 104 is also shown which may have an open face 105.

OPERATION

The invention lends itself to arithmetic drill in which the whole class or segments thereof may participate orally. Drill problems are defined by placing the function cubes of FIG. 2 or FIG. 14 upon a particular square within the grid of a board. For instance, if face 38 of the cube 37 is outward from the board 15 and placed in the position occupied in FIG. 9 by cube 45, the signal to the class is to answer with the sum of 4 and 5. The magnitude of that sum can be experienced through the tactile sense by running the fingers down the row from 4 to 1 and from 1 to 5.

If face 41 of cube 37 is outward in the same orientation the product of 4 and 5 is called for. The magnitude of the product can be comprehended by observing the number of squares encompassed within the row between the numera 4 and the indicator cube and the indicator cube and the number 5 at the other margin.

Similar drills in subtraction and division can be engendered by placement of the function cube 37 with the proper symbol oriented outwardly.

As mentioned before, ordered pairs can be plotted upon the board in any of the four quadrants defined by the X and Y axes and graphing in chalk or string can be done in a manner visible to the whole class.

The embodiment of FIG. 12 is similar in operation except that bands may be used to portray circle segments, looping about central peg 91 and two or more pegs 99 and 92A. The band from peg 91 to a lesser peg 99 may also represent a radius, instead of using rods 34.

With the combination of elements comprising the invention a teacher can communicate to the class visually, orally and through the sense of touch many of the mathematical concepts which are difficult to comprehend from perceiving through any one sense alone. Those uses of the display board set forth above are illustrative only and the scope of use encompasses the range of knowledge needed.

Many variations within the scope of the invention will occur to those skilled in the particular art and it is therefore desired that the invention be measured by the appended claims rather than by the illustrative embodiments set forth herein.

I claim:

1. A mathematics concept display device comprising
    a display board, a plurality of parallel vertical ridges, a plurality of parallel horizontal ridges, the ridges of each direction being equally spaced to divide the board surface into a grid of equal squares, a number in each of the squares of one marginal row of squares, a number in each of the squares of the adjacent oppositely extending marginal row of squares, said numbers in each row being consecutive, a central peg, a plurality of pegs, one rising from each of several of the ridge intersections, a plurality of lesser pegs defining a circle on the board centrally thereof, about the central peg, at least one indicia piece having a cavity such that the piece is adapted to seat on the board about a lesser peg, at least one flexible strand adapted to fit about a plurality of pegs to define a geometric entity adjacent the grid, a horizontal and a vertical axis on the board intersecting at the midpoint of the board, and positive and negative numbers extending from the point of intersection in conventional ordinate fashion imposed on the grid adjacent the axes.

2. A display device in accordance with claim 1 further comprising a central planar web from which the ridges rise, and a marginal rim circumscribing the web, the pegs and lesser pegs rising from the web in integral fashion.

* * * * *